Dec. 6, 1966   H. R. F. NOVOTNY   3,290,595
ELECTRICAL INSTRUMENT
Filed March 23, 1964                                    2 Sheets-Sheet 1
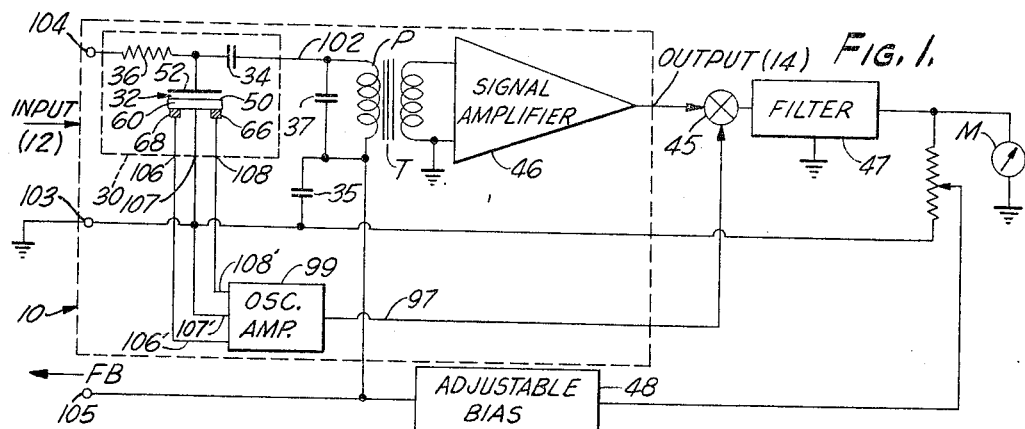
FIG. 1.
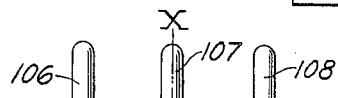
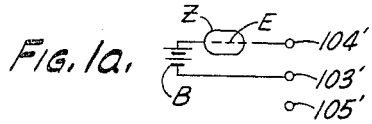
FIG. 1a.
FIG. 1b.
FIG. 1c.
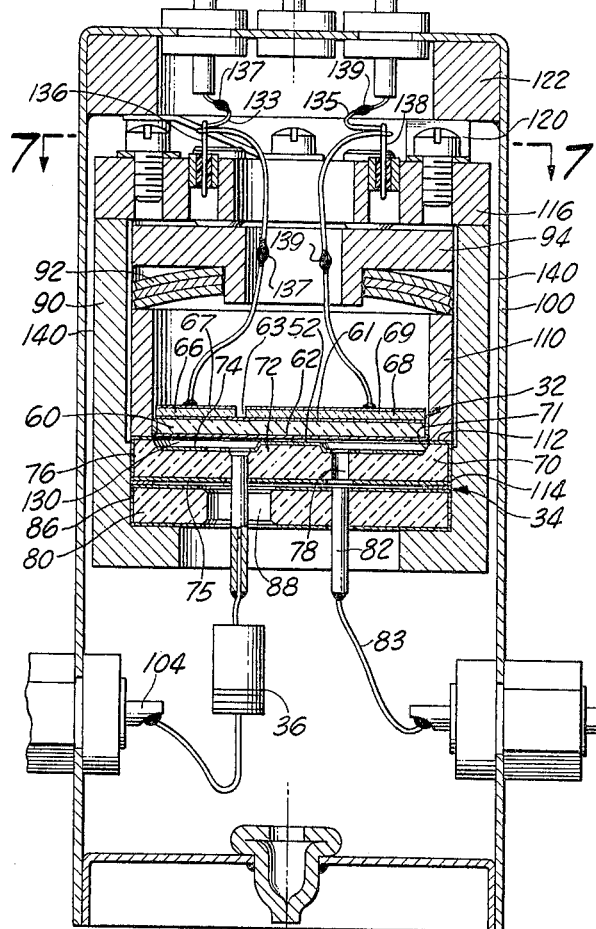
FIG. 2.
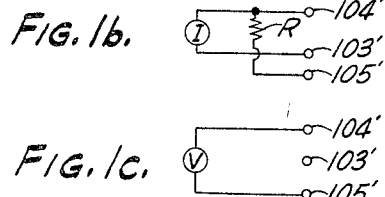
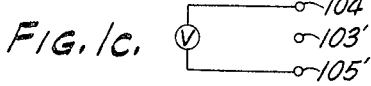
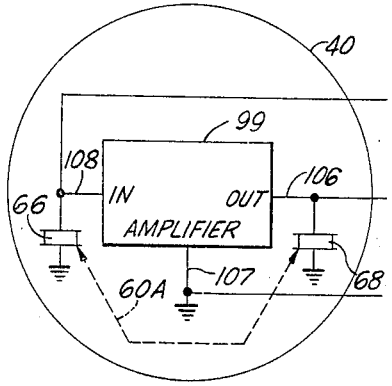
FIG. 3.
HENRY R. F. NOVOTNY
INVENTOR.
BY Reed C. Lawlor
ATTORNEY Dec. 6, 1966    H. R. F. NOVOTNY    3,290,595
ELECTRICAL INSTRUMENT
Filed March 23, 1964    2 Sheets-Sheet 2
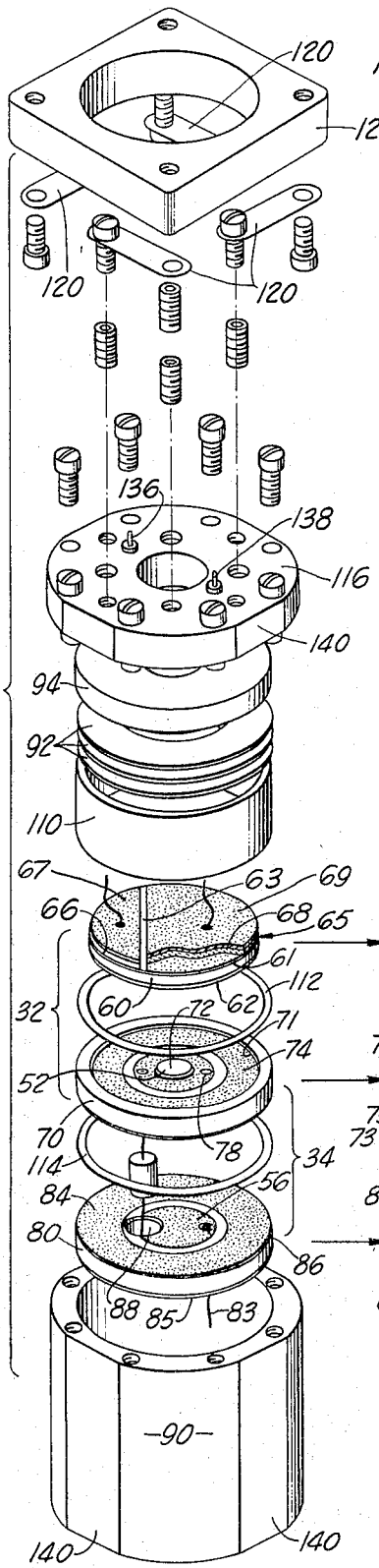
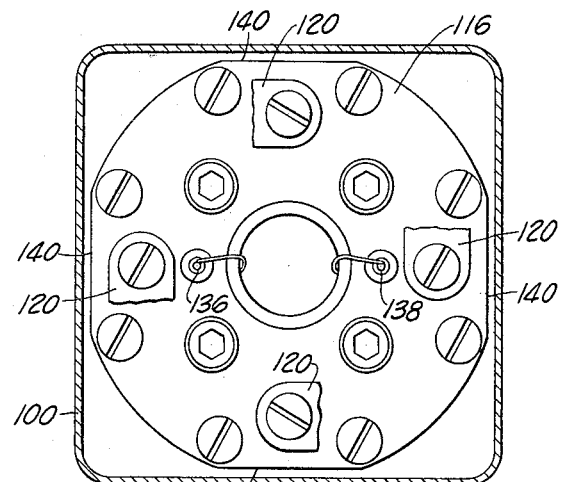
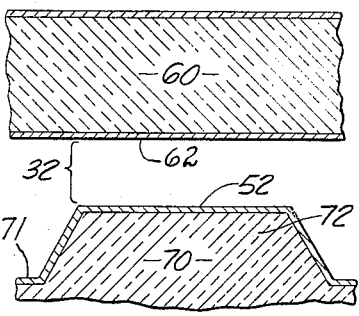
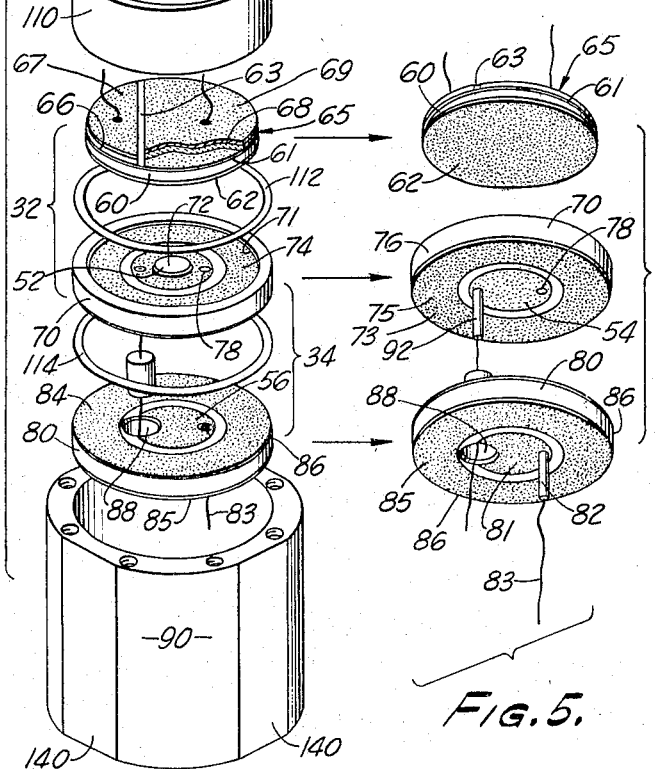
FIG. 4.
FIG. 7.
FIG. 6.
FIG. 5.
HENRY R.F. NOVOTNY
INVENTOR.
BY Reed C. Lawlor
ATTORNEY United States Patent Office 3,290,595
Patented Dec. 6, 1966

3,290,595
ELECTRICAL INSTRUMENT
Henry R. F. Novotny, South Pasadena, Calif., assignor to Applied Physics Corporation, Monrovia, Calif., a corporation of California
Filed Mar. 23, 1964, Ser. No. 353,876
30 Claims. (Cl. 324—120)

This invention relates to improvements in electrical amplifiers and especially to vibratory capacitors used therein and to D.C.-A.C. converters that employ such capacitors.

In many applications, it is desirable to convert D.C. electric signals to A.C. electric signals and to amplify the A.C. signals to provide an amplified signal which is a measure of the original D.C. signal. In some such systems the D.C.-A.C. conversion is obtained by employing the D.C. signal to modulate an A.C. signal. Such modulation may be in many forms such as amplitude modulation or frequency modulation. In other systems, a circuit through which the D.C. signal passes is periodically opened and closed by means of a periodically operated switch in order to "chop" the D.C. signal. In the former case, the A.C. signal is of a substantially sinusoidal character. In the latter case, it is of a square-wave character. In either event, the resultant A.C. signal is easier to amplify than the D.C. signal and is easier to transmit over substantial distances and is otherwise easier to employ both for signal-transmission and control purposes.

D.C.-A.C. converters are particularly useful in the measurement of very small D.C. signals such as charges, currents, or voltages from sources of high impedance. By way of example, such charges may be supplied from an ionization gauge, such currents from a mass spectrometer, and such voltages from glass electrodes in solution. In an electrometer for measuring a very small current such as a current of the order of $1 \times 10^{-15}$ amperes, the current flows through a large resistor such as a resistance of $10^{12}$ ohms to provide a D.C. voltage signal, which though small, is large enough to be converted to an easily amplified A.C. signal. Such a small D.C. voltage is converted to a corresponding A.C. voltage in a D.C.-A.C. converter and the A.C. voltage is amplified and then rectified to provide a measure of the original D.C. current.

In the present invention, the D.C. signal is applied to the opposed electrodes of an improved vibratory capacitor thereby generating an A.C. signal of corresponding amplitude in an A.C. circuit that includes the capacitor. The improved vibratory capacitor of this invention includes a vibrating electrode that forms part of a vibrating subassembly and that vibrates relative to the other electrode causing the capacitance of the capacitor to alternate about a static value. Further, in accordance with this invention, the alternation of the capacitance of said vibratory capacitor causes a current to flow in the primary winding of a transformer with an amplitude corresponding to the magnitude of the D.C. signal. In this way, the D.C. signal is converted to an A.C. signal of corresponding amplitude and this A.C. signal is thus made available for amplification, transmission, measurement, and control purposes.

In the best mode of practicing the invention now known, the vibratory capacitor is formed in part by a capacitor electrode on a surface of a vibrating plate. In the best embodiment of the invention now known, the plate is formed of a material having a high ratio of Young's modulus to density, and also having low internal friction. For reasons which will be explained hereinafter, hard monocrystalline nonconductive materials are most suitable. Of these, corundum in the form of synthetic sapphire has proved to be very satisfactory. For this reason, the invention will be described with reference to a specific embodiment thereof employing sapphire as the vibrating plate. In practice, the sapphire plate is electromechanically coupled by means of two piezoelectric transducers in a positive feedback circuit of an electric oscillator. The capacitor electrode is usually in the form of thin metallic film deposited by evaporation onto the surface of the sapphire plate. The vibration of this electrode relative to a stationary electrode provides the desired variable capacitance.

In the best mode of practicing the invention now known, the sapphire element is in the form of a circular plate that is clamped at its periphery by being compressed radially within a cylindrical mounting tube, and two mutually insulated piezoelectric elements are mounted on the sapphire plate with one of them connected in the input and the other connected in the output of an amplifier to form an electrical oscillator. The constrained sapphire plate and the piezoelectric elements and other attached parts form a vibratory subassembly. This subassembly is characterized by a fundamental resonant or natural frequency that is determined largely by the masses of the piezoelectric elements, the Young's modulus and density of sapphire, the dimensions of the plate, and the amount of radial compression to which the plate is subjected. The oscillator oscillates electrically and the vibratory unit oscillates mechanically at the natural frequency of the vibratory subassembly or vibrator unit. Precautions are taken to assure the vibration at a resonant frequency that is substantially independent of ambient conditions. Inasmuch as the main characteristics of the vibratory subassembly are largely determined by the sapphire plate, this plate is often referred to herein as the vibrating or vibratory element.

There are numerous advantages to employing a sapphire element as a mechanical vibratory element of a vibratory capacitor. One advantage resides in the fact that sapphire can be employed at high temperatures such as 250° C. or higher. Another advantage resides in the fact that sapphire possesses a high specific electrical resistivity. Another advantage resides in the fact that a sapphire element has low piezoelectric coefficient. One of the most important advantages, however, resides in the fact that the internal friction, or mechanical resistance, of sapphire is so low that, in effect, it has a high mechanical Q, so that it can be vibrated at a nearly constant frequency with a predetermined amplitude with a very low consumption of power.

Another very important advantage of employing sapphire resides in the fact that the ratio $(Y/\rho)$ of its Young's modulus (Y) to its density ($\rho$) is high, thus making it possible for the entire vibratory subassembly to vibrate at a high frequency. Additional advantages for employing sapphire reside in the fact that it may be worked to precise dimensions and to a high degree of smoothness by optical grinding and polishing techniques, thus making sapphire easy to employ in the production of a capacitor having a very thin gap between its plates and thus to provide a large capacitance that varies by a large amount for any given amplitude of vibration of the sapphire element. Because of the fact that the capacitance of a capacitor varies inversely as the distance between its electrodes, with this invention the variation in the capacitance can be made a large percentage of the static capacitance for a predetermined amplitude of vibration of the vibrating plate. By static capacitance is meant the capacitance in the absence of vibration. This results in the production of a correspondingly large A.C. signal for a given D.C. signal applied across the electrodes. Furthermore, since the amount of electric energy generated per cycle is independent of frequency, by vibrating the capacitor at high frequency, a large amount of power is made available in the A.C. signal.

In the specific embodiment of the invention disclosed herein, two sapphire plates are employed in addition to the vibratory sapphire plate. One of the additional plates and the vibratory plate are arranged in extremely closely spaced accurately established positions in a tubular mounting structure which is enclosed in a hermetically sealed dust-proof container. The adjacent surfaces of these plates are provided with electrodes formed by conductive coatings on those surfaces. Two piezoelectric elements in the form of wafer segments are cemented to one of the surfaces of the sapphire disc that is to be vibrated. The two additional plates are employed to form a coupling capacitor for coupling the A.C. signal generated by the unit to an external circuit. The entire vibratory capacitor unit is mounted in a housing that is provided with an input terminal for supplying the electric signal to be measured, suitable terminals for connection of the piezoelectric elements to an oscillator amplifier, and output terminals for delivering the A.C. signal produced by the converter to an A.C. amplifier.

Various features and advantages of this invention will be understood more readily from the following description of the specific embodiment of the invention taken in connection with the accompanying drawings in which:

FIG. 1 is a schematic diagram of a signal measuring unit utilizing a D.C.-A.C. converter embodying this invention;

FIGS. 1a, 1b, and 1c illustrate input circuits of the type which are employed with the invention when operated in the charge mode, the current mode, and the voltage mode, respectively;

FIG. 2 is a longitudinal cross-sectional view of the vibratory capacitor unit employed in this embodiment of the invention;

FIG. 3 is a block diagram of the oscillator that vibrates the capacitor;

FIG. 4 is an exploded view indicating the relative positions of many of the parts of the vibratory capacitor unit;

FIG. 5 is an exploded view of the sapphire elements together with some of the associated parts viewed from the opposite direction from that in which the view of FIG. 4 is taken;

FIG. 6 is an enlarged fragmentary view of parts that form the vibratory capacitor; and FIG. 7 is a view taken on the plane 7—7 of FIG. 2.

Referring to FIG. 1 there is shown a measuring system that comprises a D.C.-A.C. converter 10, including a variable capacitor unit 30 embodying this invention. This converter is employed for converting a D.C. signal applied to its input 12 into an A.C. signal appearing at its output 14. The amplitude of the output A.C. signal generated by the converter is very nearly proportional to the magnitude of the input D.C. signal, the degree of proportionality depending somewhat on the linearity of the amplifier 46. As indicated, three terminals are shown at the input, namely, a ground terminal 103, an input terminal 104, and a feedback terminal 105. The unit may be employed in any one of three modes, namely, a charge mode, a current mode, and a voltage mode.

By way of example, when employed in the charge mode to measure the charge developed by an ionization gauge Z, the gauge is connected in series with a battery B between terminals 103' and 104', indicated in FIG. 1a, which are connected respectively to the terminals 103 and 104 of the measuring system. When connected in the current mode, current from the source I is supplied through terminals 103' and 104' indicated in FIG. 1b to the terminals 103 and 104 at the input. In this case, a feedback resistor R is connected between the input terminal 104' and a terminal 105' and the latter terminal is connected to the feedback terminal 105 at the input of the measuring system. When connected in the voltage mode, the voltage from a source V is applied between terminals 104' and 105', indicated in FIG. 1c, to the input terminal 104 and the feedback terminal 105, respectively.

The invention will be described hereinafter specifically with reference to its use in the charge mode. In this case, the amplitude of the A.C. signal developed at the output 14 of the measuring system is substantially proportional to the charge $q$ that is fed into the input terminal 104. This charge flows through a high resistance 36 and is divided between the vibratory capacitor 32 and the fixed capacitor 34 of the vibrator capacitor unit as hereinafter explained.

As a result, an alternating current that has an amplitude proportional to the amount of charge that has flowed into the vibratory capacitor, is developed in the primary winding P of a high-impedance transformer T. This A.C. signal is transmitted through a signal amplifier 46 to a synchronous rectifier 45. The rectified output of the rectifier 45 is passed through a low-pass filter 47 to an electric meter M or other indicating device that responds to the D.C. component of the filtered signal and thus serves to indicate the quantity of charge impressed on the measuring system.

The variable capacitor unit 30 comprises a variable capacitor 32 and a fixed capacitor 34 of low capacitance and a resistor 36. An oscillator amplifier 99 external to this unit coacts with the variable capacitor 32 to cause its capacitance to vary. One end of the resistor 36 is connected to the junction between the two capacitors 32 and 34. The other end of the resistor 36 is connected to the charge collector electrode E of the ionization gauge Z. The structure of the variable capacitor unit 30 is described more fully hereinafter.

In order to isolate the A.C. circuit from the D.C. circuit, the voltage developed across the variable capacitor 32 is applied through the fixed coupling capacitors 34 and 35 to the opposite ends of the primary winding P. A portion of the D.C. output from the filter 47 is fed through an adjustable bias supply 48 to one end of the primary winding P in order to provide at terminal 105 a negative feedback D.C. signal proportional to the charge being measured. This D.C. signal is applied to the vibratory capacitor 32 by electrostatic coupling through the capacitor 34.

By virtue of the fact that the vibratory capacitor operates at relatively high frequencies, it is possible to employ in the transformer T a small, low-weight core composed of powdered permalloy, or similar ferromagnetic material having low hysteresis losses. Though a two-winding transformer has been shown, an auto-transformer can be employed. The adjustable bias supply 48 is employed to counteract contact potentials and the like that might otherwise produce an output indication on the meter M even though no signal is applied to the input 12. It is especially advantageous to eliminate the effects of such potentials since very small electric signals are to be measured with this measuring system.

With this arrangement the charge $q$ from the ionization chamber Z leaks through the resistor 36 to the ungrounded plate of the variable capacitor 32 causing this capacitor to accumulate a charge such that the voltage across the vibratory capacitor 32 on the average is substantially equal to the voltage developed on the electrode E of the ionization chamber Z. The period of alternation of the vibratory capacitor is made short compared with the time constant of the circuit including the vibratory capacitor 32 and the resistor 36. For this reason, the total charge on the capacitors 32 and 34 remains substantially constant as the capacitor vibrates.

With such a circuit, with the total charge on the capacitors 32 and 34 substantially constant, as the capacitance of the vibratory capacitor 32 varies while the capacitance of the other capacitor 34 remains constant, a corresponding alternating current flows between the capacitors and through the primary winding of the transformer P. In this connection it will be borne in mind that the charge $q$ on a capacitor is related to the voltage across the capacitor by the equation $$q = VC$$

Consequently, where, as in this case, the charge on the two capacitors 32 and 34 is substantially constant, the alternation in the value of the capacitance C causes a corresponding alternation in the voltage on the capacitor. Thus, the charge on the vibrating capacitor 32 is varied by virtue of the fact that the charge fed into the input 12 is shared between the variable capacitor 32 and the fixed capacitor 34. In practice the capacitance of the vibratory capacitor 32 may be considered as rising and falling approximately sinusoidally causing a sinusoidal alternating current to flow through the primary winding P.

According to this invention, the capacitor 32 is formed between a stationary electrode 52 and a vibrating electrode 62. The latter electrode 62 is mounted on one face of a sapphire disc 60 and two piezoelectric elements 66 and 68 are mounted on the opposite face. The upper faces of the piezoelectric elements are provided with electrodes 67 and 69 in the form of metallic coatings. Similar electrodes are formed on the lower faces of the piezoelectric elements. The sapphire disc 60 and the two piezoelectric elements 66 and 68 constitute a vibrator element of subassembly 65 that has a natural or resonant frequency that depends largely on the radius and thickness of the disc 60, the Young's modulus and density of the sapphire, and the mass of the piezoelectric elements, and also partly on the radial stress exerted by the mounting tube on the sapphire disc 60.

The electrode 67 on one of the piezoelectric elements 66 is connected to the input of an oscillator amplifier at terminal 108' and the electrode 69 on the other piezoelectric element 68 is connected to the output of the oscillator amplifier at terminal 106'. In this arrangement, the oscillator formed by the amplifier 99 and the piezoelectric elements 66 and 68 and the sapphire plate 60 oscillates at the mechanically resonant frequency of the vibrator unit 65. A connection 97 between the oscillator amplifier and the synchronous rectifier 45 is provided to demodulate the A.C. signal appearing at the output 14 of the signal amplifier so as to produce a D.C. signal which is proportional to the A.C. signal produced by the vibratory capacitor which in turn is proportional to the D.C. signal applied to the input 12 of the measuring system. This rectified output is transmitted, as mentioned above, to the measuring meter M or other indicator or utilization device.

As shown in FIG. 2 the variable capacitor unit 30 comprises a metallic case or can 100 having, in effect, four insulated terminals 102, 104, 106 and 108, and a ground terminal 107.

The four terminals 102, 104, 106 and 108 are electrically insulated from the case and from each other. The case or can itself is grounded by connection to the terminal 107. The terminals 107 and 104 act as the input for the D.C. charge and the terminals 102 and 107 act as the output for the A.C. signal into which the D.C. signal is converted. The terminals 106, 107, and 108 serve as connections to the oscillator amplifier 99.

In the vibratory capacitor unit of this invention illustrated in FIGS. 2, 4, 5, 6, and 7, the capacitor 32 is formed by a vibrating electrode 62 and a stationary electrode 52, while the capacitor 34 is formed by two stationary electrodes 54 and 56 that are formed on the opposed faces of sapphire discs 70 and 80. All of these various electrodes are formed by metallic coatings on sapphire discs 60, 70, and 80, which are supported in mutually spaced relation in the unit 30 by means of thin spacer rings 112 and 114.

The three discs 60, 70, and 80 are mounted coaxially with a central axis X—X in a cup-shaped holder 90 one above another in the order mentioned and are supported in fixed relation therein by means of a Belleville washer or cone spring 92 held in place my means of various screws and a cap member 94, suitable spacers and top plate 116.

The lowermost disc 80 is provided on its upper and lower surfaces with a pair of central circular electrodes 56 and 81. These two electrodes are electrically connected together by means of a terminal rod 82 which in turn is connected by means of a wire or lead 83 to the external terminal 102. But they are insulated from all other parts.

The upper and lower surfaces of disc 80 are provided with outer annular shaped electrodes 84 and 85 that are interconnected by means of a cylindrical electrode 86 formed on the outer cylindrical surface of the disc 80. The annular electrodes 84 and 85 are radially spaced from and insulated from the central circular electrodes 56 and 81 and are connected together through the electrode 86, thus providing an electrostatic shield in the form of guardrings that are concentric with the central circular electrodes 81 and 56. A hole 88 extends through the disc 80 in a direction parallel to the axis X—X but is offset from the center of the disc for purposes which will be hereinafter explained.

The center disc 70 is of somewhat the same configuration as the lower disc 80 except, however, that it is formed with an annular channel or recess 71 in the upper surface thereby forming a circular island or anvil 72 that projects upwardly therefrom. The upper circular electrode 52 completely covers and overlaps the anvil 72 as indicated in FIG. 6. The upper and lower surfaces of disc 70 are likewise provided with outer annular shaped electrodes 74 and 75 that are interconnected by means of a cylindrical electrode 76 formed on the outer cylindrical surface of the disc 70.

The annular electrodes 74 and 75 are radially spaced from and insulated from the central circular electrodes 52 and 54 thereby providing an electrostatic shield in the form of guard rings that are concentric with the central circular electrodes 52 and 54. A hole 78 extends through the disc 70 in a direction parallel to but along an axis offset from the center of the disc for purposes which will be hereinafter explained.

The entire external surface of the upper disc 60 is coated with metallic material so that the electrodes 61 and 62 on its upper surfaces and its lower surfaces respectively are interconnected by means of electrode material around the periphery of the disc. Two wafer segments 66 and 68 of piezoelectric material are bonded to the electrode 61 on the upper surface of the disc 60 by means of electrically conducting epoxy cement that retains its bonding properties even at high temperatures above about 250° C. In the simplest embodiment of the invention, the piezoelectric segments are made from a single piezoelectric disc or wafer having a diameter almost as great as that of the sapphire disc 60 and the upper surface of the piezoelectric disc is coated with electrode material. The side cylindrical surface of the wafer is maintained free of metallic material. This piezoelectric wafer is then cut into two segments before cementing in place, thus providing two segmental piezoelectric elements each of which, in effect, has electrodes on its upper and lower surfaces. One of the piezoelectric segments 68 is employed as a driver element to cause the sapphire disc 60 to vibrate while the other 66 is employed as a pickup element to detect that vibration and the two are connected in the feedback circuit of the amplifier 99 to cause the disc 60 to vibrate in its fundamental radial mode. The piezoelectric wafer is normally composed of a ceramic polycrystalline material such as barium titanate, lead zirconate or the like.

The vibrator disc 60 is mounted firmly within a circular support ring 110, being shrunk fit therein. In order to provide such a shrunk fit, the support ring 110 is composed of a material such as 416 stainless steel having a temperature coefficient of expansion greater than that of the material composing the disc 60 and the diameter of the disc 60 is slightly oversized compared with the inner diameter of the support ring 110 at room temperatures. In such a case the two elements are heated to an elevated temperature such as 600° C., the disc is placed within the end of the support ring 110 and the ring and cylinder are permitted to cool while the disc is held within the lower end of the support ring 110. The vibrator disc is made of a thickness which permits it to be held under compression while still forming a vibrating element having high rigidity. In practice, the disc bends or dishes outwardly very slightly toward the anvil 72. The lower edge of the ring 110 is ground and polished optically smooth and flat. While such grinding and polishing is usually performed before coating and mounting disc 60, the coating may be applied first so long as the grinding and polishing are performed without cutting through the metallic coating on the lower side of the disc 60. With this arrangement then, the disc is rigidly held in place within the support ring and the entire coated surface thereof is electrically connected to the support ring, while the outer edges of the piezoelectric elements are spaced slightly from the support ring thereby insulating the upper electrodes of the piezoelectric elements from the support ring.

The unit is assembled with a thin spacer ring 112 between the support ring 110 and the outer raised annulus of the disc 70 and with a further spacer ring 114 between the adjacent outer surfaces of the discs 70 and 80. The discs 60, 70, and 80, together with the spacer rings 112 and 114, together with the support ring 110 and the springs 92, and together with spring guide 94 are supported together in a cylindrical array by means of screws extending through a cap ring 116. This assembly is resiliently supported in place within the case 100 by means of four leaf springs 120 each of which is mounted at one end on the cap ring 116 and at the other end on the end ring 122. The cup member 90 is of a slightly smaller diameter than the case 100, thus permitting the subassembly to hang freely within the case. The end ring 122 is held in place by brazing to the can.

A pair of terminal lugs 136 and 138 are insulatingly mounted in the cap ring 116 to provide intermediate electrical connections between the upper electrodes of the piezoelectric elements and the corresponding terminals 106 and 108. More particularly, the upper electrode 67 of the piezoelectric element 66 is electrically connected to the intermediate terminal 136 and to the terminal 106. Also the upper electrode 69 of the piezoelectric element 68 is electrically connected to the intermediate terminal 138 and to the control electrode 108. Flexible braided wire leads 133 and 135 bearing globules of solder 137 and 139 provide electrical connection but vibration insulation between the piezoelectric discs and the case.

After the assembly and end ring 122 have been placed in the container and the various electrical connections to the terminals 102, 104, 106, and 108 have been made, the lower end of the container is closed and the space within the container is evacuated. Gas flow can occur readily between the lower part of the container and the upper part of the container. Gas flow passages for this latter purpose are provided by reduced areas 140 in the periphery of the cup-shaped container 90 and the cap ring 116. In this connection, it is also to be noted that a gas flow passage is provided by holes 78 and 88 between the space 71 between the electrodes 52 and 62 and the space between the electrodes 54 and 56 and the lower part of the container.

With the foregoing assembly it will be noted that the capacitance of the vibrator capacitor 32 that is determined primarily by the area of the anvil 72, can be made quite large and subject to large variations by minimizing the gap between the anvil 72 and the lower electrode 62 on the disc 60, as indicated in FIG. 6, and limiting the effective capacitance to the central portion of the discs 60 and 70. The limitation of the capacitance to the central portions of the discs is achieved partly by initially grinding and polishing the upper surface of the disc 70 to optical-flat precision and then forming the annular channel or recess 71 in that disc and partly by employing a spacer ring 112 that is very thin between the discs 60 and 70. The upper surface of the anvil 72 and the upper surface of the outer ring of the disc 70 are coplanar. Likewise, the lower surface of the disc 60 is ground and polished to optical-flat precision after being shrunk fit within the end of the tube 110 so that it presents a smooth flat surface opposite the anvil. Such grinding and polishing make it possible to space the electrodes very close together without danger of making electrical contact between them. The gap betwen the electrode 52 on the upper surface of the anvil 72 and the electrode 62 on the lower surface of the disc 60 is established by the thickness of the annular ring 112. By employing a ring that is very thin, the thickness of the gap may be made as small as about 0.0001″. The diameter of the anvil is about 0.2″. In a specific case, the capacitance of the capacitor so formed was about 45 pF; but it may be made larger. This capacitance is made variable by vibrating the upper disc 60 in its fundamental, that is, radially symmetrical, mode in which the center portion of the disc vibrates along the central axis X—X of the unit while the periphery of the disc remains fixed to the holding ring 110. In practice it is found that a disc can be provided which vibrates with an amplitude of about 0.00005″ which is about 50% of the gap, thus resulting in a very large variation in the capacitance. In practice the vibration amplitude has been made as much as about 70% of the distance between the plates when the capacitor is not vibrating. This vibration is produced by connecting the piezoelectric segments 66 and 68 to the amplifier 99 to form an oscillator as indicated in FIG. 3.

The spacer ring 114 is of a greater thickness than spacer ring 112 and is so chosen that the capacitance of the fixed capacitor 34 is typically somewhat smaller than the capacitance of the vibrator capacitor 32.

In order to vary the capacitance of capacitor 32 the upper electrode 69 of the driving piezoelectric element 68 is connected to the output terminal 108 of the electronic amplifier 99 and the upper electrode 67 of the driven piezoelectric element 66 is connected to the input terminal 106 of the same amplifier as indicated in FIG. 3. In this diagram the mechanical coupling between the two piezoelectric elements 66 and 68 provided by the sapphire disc 60 is indicated by a dashed double headed arrow 60A. The phase shift between the input and the output of the amplifier is so chosen that an electric signal appearing at the output 108 of the amplifier causes a signal to be fed back to the input 106 of the amplifier so as to cause electrical oscillation at the resonant frequency of the vibrator unit 65. In the oscillating process, alternating electric fields applied to the driver element 68 apply an alternating or oscillating force to the disc 60 causing it to flex in a corresponding alternating manner. The resultant vibration of the sapphire disc 60 strains the driven piezoelectric element 66 causing it to generate electric potentials between its electrodes thereby applying an alternating electrical signal to the input of the amplifier. In order to help insure vibration of the disc 60 at its fundamental mode, a broadly tuned electric circuit having a resonant frequency corresponding to the frequency of that fundamental mode of vibration of the sapphire disc 60 can be incorporated between the input and the output of the amplifier so that the amplifier has a higher amplification at that frequency than at other frequencies at which the disc might vibrate. For this purpose such a filter is employed that has a much lower Q than the Q of the disc 60 so that the frequency of oscillation is controlled by the sapphire disc.

In the best mode of practicing this invention now known, the disc 60 is composed of sapphire. For this purpose synthetic sapphire is used. Such sapphire is monocrystalline in nature. Though the orientation of the crystal axis is not critical and satisfactory operation may be obtained with the axis extending in other directions, the crystal axis is preferably parallel to the longitudinal axis X—X of the unit. Sapphire is particularly suitable because it has an extremely high ratio $(Y/\rho)$ of Young's modulus $(Y)$ to density $(\rho)$, low internal friction, low piezoelectric properties, and high electrical resistivity. Since the resonant frequency of the disc alone at the fundamental mode is determined by the equation $$f = K\sqrt{\frac{Y}{\rho}} \qquad (1)$$

where K is a shape factor that depends upon the thickness and diameter of the disc 60, it can be seen that for a disc of any specific dimensions, by selecting a material having such a high ratio $(Y/\rho)$ the resonant frequency $f$ is made higher than it would be for a disc of different material but the same shape. Furthermore, the internal friction or viscosity of sapphire is very low. Consequently, high amplitude of vibration can be attained for given power consumption. In effect the sapphire disc has a high Q. By making the Q of the disc high compared with the Q of the oscillator amplifier 99, the resonant frequency is controlled by the sapphire disc rather than by the amplifier. Furthermore, since the capacitance of the variable capacitor 32 is determined by the central portion of the surface of the disc 60 opposite the anvil, and this portion vibrates with maximum amplitude, it is clear that for a given amplitude of vibration maximum percentage change in capacitance is attained with the anvil construction and electrode construction described. Accordingly, optimum operation is achieved. Due to the fact that the frequency is high and the percentage capacitance change is large, the electrical power in the A.C. signal in the output is made large. In practice the resonant frequency of the vibrator unit 65 depends in part on a number of other factors including the shape and mass of the piezoelectric elements 67 and 69 and the manner in which they are bonded to the plate 60. But this fact does not alter the fundamental principle underlying this invention, namely, that the resonant frequency can be made high by employing for the vibrating plate a material having a high ratio of Young's modulus to density.

The use of a relatively high frequency of vibration also makes it possible to employ a transformer T of relatively small size, low cost, and efficient design. In practice, maximum efficiency is attained by establishing the value of the capacitance of the coupling capacitor 34 and the inductance of the primary winding P of the transformer T at such values as to tune the input of the amplifier 46 at the frequency of vibration. In practice, tuning is most conveniently accomplished by connecting a variable trimmer capacitor 37 across the primary winding P. At the same time, because of the low internal friction of the disc, the power consumed by the disc is small thus reducing the driving power requirements of the amplifier. While the disc could be vibrated in response to the output of an oscillator that is tuned entirely electrically, it is far more effective to employ the disc itself to determine the frequency of oscillation of the oscillator since in such a case, problems that might otherwise arise in matching the frequency of oscillation with the frequency of vibration are eliminated.

Optimum results are obtained by preserving a high resistance between the electrodes 52 and 54 of the vibrator capacitor 32 and ground (the grounded guard rings 74 and 75) and also between the electrodes of the fixed capacitor 34 and ground. Such high resistance is easily obtained by also making the intermediate disc 70 of sapphire. Additionally, in order to minimize any detrimental effects that might arise because of the differences in thermal expansion properties of different materials, the disc 80 is also made of sapphire. In addition, maximum resistance between parts is attained by virtue of the evacuation of the entire unit. Such evacuation reduces current flow between electrodes otherwise caused by ionization of gas due to bombardment by particle radiation such as α-particles emitted from traces of radioactive materials in the various mechanical parts of the capacitor unit. Evacuation also reduces power consumption of the oscillator and reduces damping otherwise caused by the presence of gas. In this way higher Q's than otherwise are obtained for the disc. Another advantage of evacuation lies in the fact that acoustical coupling between parts is minimized.

The cup-ring 90 and the cap-ring 116 as well as the screws, the Belleville-washer springs 92 and the spring guide 94 are composed of metal. As a result, the entire electrode surface of the disc 60 and the annular shields, or guard-rings, on the outer portions of the discs 70 and 80, are all electrically connected together, and they are grounded to the case 100 through the medium of the springs 120 and the cap-ring 122. Furthermore, all of the metallic parts are non-magnetic thus minimizing electromagnetic interaction between the vibrator unit and other instruments in its neighborhood.

It is also desirable to isolate the capacitor subassembly, including the discs 60, 70, 80 and their support members 90, 110, and 116, from the case in order to minimize transmission of vibration between the case and the capacitor subassembly. For this purpose, the end ring 116 is supported by means of the soft resilient springs 120 from the cap ring 122 and the support members 90 and 116 are spaced from the case. In addition, the various electrical leads between the vibrating parts and the terminals are made of flexible braided wire and the leads 133 and 135 are weighted with small globules of solder to improve vibration insulation between the case and the capacitor assembly. The evacuation of the case also aids in achieving mechanical vibration insulation.

While I have described my invention as being of a specific configuration and as employing parts composed of specific materials, it will, of course, be understood that my invention may be embodied in other forms and that the parts may be made of other materials. For example, while the discs have been described as being composed of sapphire, some of the advantages of this invention may be obtained by making them out of other nonmagnetic, nonpiezoelectric materials of low internal friction, high Young's modulus, and high tensile strength. Materials especially suitable, in addition to corundum, or sapphire, include diamond, magnesium oxide, spinel, and fused quartz. Additionally, crystalline quartz may be used in applications where its piezoelectric properties are not detrimental. In some cases metallic materials may be employed, such as annealed steel, drawn tungsten, molybdenum, titanium, and Elinvar. Of these materials herein above mentioned, those most suitable from a physical standpoint, are hard organic monocrystalline, nonpiezoelectric and nonconductive materials, including corundum (sapphire), diamond, and magnesium oxide. The use of such materials is particularly suitable since they all have high values of the ratio $Y/\rho$, that is, values over about $5 \times 10^{11}$ cm.$^2$/sec.$^2$. By the use of materials having such high ratio, it becomes relatively easy to manufacture vibratory capacitors that vibrate at frequencies in the ultrasonic range, that is, at frequencies above about 20 kc.p.s. Units that operate in such range not only have the advantage of high efficiency, but also are easier to use since vibrations transmitted to the surrounding atmosphere are in the ultrasonic range, thus avoiding acoustic annoyance to the ordinary user. Of all of these materials, corundum (sapphire) is the most suitable because it combines high $Y/\rho$ ratio with relatively low cost and high electrical resistivity and ready availability. Materials of high electrical resistivity are particularly desirable to employ where it is desired to provide a unit such as that specifically described hereinabove in which three discs composed of the same material are employed at least one of which must be nonconductive in order to provide the desired insulation between the stationary electrode of the vibrator capacitor and an electrode of the fixed capacitor.

It is to be noted that the vibrating element of the embodiment of the invention disclosed is in the form of a relatively rigid though elastic plate as distinguished from a stretched or tensioned membrane. Whereas a membrane loses its shape when free of tension, the rigid plates of this invention preserve their shape when free of tension except possibly for slight flexing, even when subjected to small radial compression.

As employed herein above, the term monocrystalline is used in the sense in which it is understood in optics; it being recognized for the present purposes that where a material is monocrystalline in the optical sense, then even though it might be slightly polycrystalline in the strict crystallographic sense, such slight imprefections do not substantially reduce the Young's modulus and tensile strength otherwise characteristic of the material and hence do not cause serious reduction in the resonant frequency.

In one specific embodiment of the invention the discs were made with diameters of about 1.0". The two lower discs 70 and 80 had thicknesses of 0.125" at their thickest points while the thickness of the vibrating disc 60 was 0.04". The channel surrounding the anvil of the disc 70 had a depth of about 0.010" while the anvil itself had a diameter of 0.187". The two piezoelectric segments had thicknesses of about 0.008".

The stationary discs 70 and 80 are made thicker than the vibratory disc 60 and are so proportioned that the resonant frequencies of the stationary discs are higher than the resonant frequency of the vibratory subassembly. In this way and also by designing the other members of the converter to have resonant frequencies different from that of the vibratory subassembly, parasitic oscillations and damping otherwise caused by coupling of such other members to the vibratory disc are almost completely avoided.

In the vibratory capacitor illustrated, two piezoelectric elements were employed, one for exciting the vibration and one for detecting the vibration. In some modifications of the invention a single piezoelectric element is employed for exciting vibration in the vibratory element and some other type of element is employed to detect the resultant vibration such as a capacitor formed by a metal surface of the vibratory element and an electrode mounted in a fixed position nearby.

In some modifications of the invention the vibratory capacitor is not of circular configuration but is of some other configuration.

In any event, the vibratory element has a high Q and the oscillator amplifier is designed to have an amplitude vs. frequency response characteristic that is very board compared with the amplitude vs. frequency response characteristic of the vibrator elements so that the frequency of oscillation is controlled by the characteristics of the mechanical resonating element of high Q rather than being controlled by the circuit elements of the amplifier. In practice the amplifier generally has a flat or nearly flat amplitude vs. frequency response in the neighborhood of the resonant frequency of the vibratory element.

By a high-Q mechanical vibratory element is meant a vibratory element in which the energy mechanically dissipated on the average per cycle of vibration is a very small part of the total vibratory energy, both kinetic and potential, existing in the element while vibrating. In practice the Q of the vibratory plate described is over 2000. In this connection it is to be borne in mind that $$Q = 2\pi \frac{\text{total energy of vibration}}{\text{energy loss/cycle of vibration}}$$

when Q is high, say greater than about 10, Q is related to the decrement per cycle $d$, a well known term, by the equation $$d = \frac{\pi}{Q}$$

While I have described the invention as applied to a vibrator capacitor used in a D.C.-A.C. converter, it will be understood that the invention may also be employed for other purposes. It is therefore to be understood that this invention may be embodied in many forms and that many of the features of this invention may be employed in other ways than those described herein. While the invention has been described as employing a piezoelectric driver element and a piezoelectric pickup element, it will be understood that other types of driver and pickup elements may be employed, and that in some cases only one piezoelectric element bonded to the vibrator element will be satisfactory. It is therefore to be understood that the invention is not limited to the specific device that is described herein by may be embodied in many other devices within the scope of the appended claims.

The invention claimed is:

1. In a D.C.-A.C. converter:
a vibratory capacitor having a pair of relatively movable capacitor electrodes, means for applying a D.C. signal to be measured across said electrodes, a vibration generator for effecting relative oscillatory movement of said electrodes to periodically vary the capacitance of said capacitor, and circuit means capacitively coupled to said vibratory capacitor for measuring the amplitude of oscillation of the voltage of said vibratory capacitor produced by the combined action of said D.C. signal and the oscillatory movement of said electrodes,
the improvement wherein said vibratory capacitor comprises a vibratory plate that establishes the resonant frequency of said oscillatory movement and electromechanical means for vibrating said plate at said frequency, said electromechanical means comprising an amplifier having an input and an output and two piezoelectric elements mounted on said vibratory plate, one of said piezoelectric elements being connected in the output of said amplifier and the other being connected in the input of said amplifier, whereby said vibratory plate oscillates at said frequency.

2. In a combination of a vibratory capacitor having a pair of relatively movable capacitor plates with a vibration generator for effecting relative oscillatory movement of said plates to periodically vary the capacitance of said capacitor, the improvement wherein one of said plates is provided with a projecting anvil facing the other plate, and wherein one of said plates is of circular configuration and is clamped along its periphery, said circular plate being adapted to vibrate in its radially symmetrical mode and electromechanical means for vibrating said plate in said mode.

3. In a combination of vibratory capacitor comprising a pair of relatively movable capacitor electrodes with a vibration generator for effecting relative oscillatory movement of said electrodes to periodically vary the capacitance of said capacitor,
the improvement wherein said vibratory capacitor comprises an electrode on the surface of a vibrating element composed of an inorganic monocrystalline material, said element establishing the frequency of said oscillatory movement, and electromechanical means for vibrating said element at said frequency.

4. In the combination defined in claim 3, the improvement wherein said material is sapphire.

5. In a vibratory capacitor, a first capacitor electrode, a body member composed of an inorganic monocrystalline material having a ratio ($Y/\rho$) of Young's modulus ($Y$) to density ($\rho$) greater than about $5 \times 10^{11}$ cm.$^2$/sec.$^2$, said body member being provided with a metallic layer thereon that acts as a vibrating capacitor electrode of said capacitor when said body member is vibrated.

6. In a vibratory capacitor, a body member composed of an inorganic monocrystalline material having a ratio $(Y/\rho)$ of Young's modulus $(Y)$ to density $(\rho)$ greater than about $5 \times 10^{11}$ cm.$^2$/sec.$^2$, said body member being provided with a metallic layer thereon that acts as a vibrating electrode of said capacitor; and
 a pair of piezoelectric elements mounted on said body member at mutually spaced-apart points thereof.

7. In a vibratory capacitor, a corundum body member provided with an electrode layer thereon that acts as a vibrating electrode of said capacitor; and
 a pair of piezoelectric elements mounted on said body at mutually spaced-apart points thereof.

8. In a vibratory capacitor:
 a disc composed of insulating material and having a pair of metallic electrodes on opposite sides thereof, one of said electrodes acting as a vibrating electrode of said capacitor; and
 a pair of piezoelectric elements mounted on the other electrode at mutually spaced-apart points thereof.

9. In a vibratory capacitor, a circular plate having an electrode on one side thereof providing a vibrating electrode of said capacitor; and
 means engaging said plate only radially about its periphery for rigidly supporting said plate.

10. A vibratory capacitor as defined in claim 9 wherein said means compressively engages said plate.

11. A vibratory capacitor comprising:
 a stationary capacitor plate;
 a corundum disc supporting on one of its sides a vibratory capacitor plate facing said stationary plate;
 two spatially separated piezoelectric crystal wafer segments attached to the other side of said sapphire disc and forming therewith a vibrator element having a resonant frequency;
 a common electrode interposed between said disc and said wafer segments;
 two electrodes individually contacting said piezoelectric crystal wafer segments; and
 an electric amplifier connected to said three electrodes to cause said corundum disc to vibrate at said resonant frequency.

12. A vibratory capacitor comprising:
 a first corundum disc carrying an electrode layer;
 a second corundum disc having on one side a first electrode layer positioned adjacent the electrode layer adjacent said first disc, there being a gap between said layers;
 two spatially separated piezoelectric crystal segments attached to the other side of said second sapphire disc and forming therewith a vibrator element having a resonant frequency, there being a common electrode interposed between said second disc and said segments;
 two electrodes individually contacting said piezoelectric crystal segments; and
 an electronic amplifier interconnecting said two electrodes and said common electrode and having said second corundum disc as feed-back element to complete therewith an oscillator oscillating at said resonant frequency.

13. A vibratory capacitor comprising:
 a first corundum disc carrying an electrode layer;
 a second corundum disc having on one side a first electrode layer positioned adjacent the electrode layer of said first disc, there being a gap between said layers; and
 electromechanical means for vibrating said second corundum disc at a resonant frequency determined by the properties of said second disc.

14. A vibratory capacitor as set forth in claim 13, one of said discs having an annular recess, a central anvil and a marginal wall coplanar with said anvil, and a spacer ring between said marginal wall and said first electrode layer of said second disc.

15. A vibratory capacitor as set forth in claim 14, said electrode layer on said first disc extending over and beyond said anvil into said recess, there being a second electrode layer in said recess spaced apart from the first mentioned electrode layer of said first disc.

16. A vibratory capacitor comprising:
 a plate capable of sustaining mechanical vibrations;
 a capacitor electrode on said plate;
 a coupling electrode on said plate spaced apart from said capacitor electrode;
 two piezoelectric crystal segments on said coupling electrode and being mechanically coupled by said plate;
 an amplifier having said piezoelectric crystal segments as input and output elements; and
 means for mounting a stationary electrode adjacent said capacitor electrode on said plate.

17. A vibratory capacitor as defined in claim 16, wherein said coupling electrode and said capacitor electrode are located on opposite surfaces of said plate.

18. A D.C.-A.C. converter comprising:
 a vibratory capacitor having at least one movable electrode;
 an inorganic monocrystalline element supporting said electrode;
 means for applying a D.C. signal to said capacitor;
 impedance means and a second capacitor connected in series across said vibratory capacitor for drawing an A.C. voltage from said vibratory capacitor, the amplitude of which corresponds to said D.C. signal;
 an electrode on said element;
 two spatially separated piezoelectric crystal segments attached to said element on the side thereof opposite to that supporting said capacitor plate and forming therewith a vibrator element having a resonant frequency;
 two electrodes individually contacting said piezoelectric crystal segments; and
 an amplifier interconnecting said two electrodes to cause said monocrystalline element to oscillate at said resonant frequency.

19. In a D.C.-A.C. converter having a first variable capacitor connected in series with a second fixed capacitor, wherein a D.C. voltage is applied across said first capacitor, and an A.C. voltage is drawn from said second capacitor, the improvement comprising:
 a first, a second, and a third disc;
 a first electrode on one side of said first disc;
 a first electrode on one side of said second disc;
 means for mounting said first and second discs so that said first electrodes thereof face each other to form said variable capacitor;
 a second electrode on said second disc on the opposite side thereof; a first electrode on said third disc;
 means for mounting said third disc so that said first electrode thereof faces said second electrode of said second disc to form said fixed capacitor;
 a second electrode on the opposite side of said first disc; and
 an electronic oscillator having a piezoelectric input and output elements attached to said second electrode of said first disc and being mechanically coupled by said first disc, said oscillator oscillating at a resonant frequency determined by the properties of said first disc.

20. A capacitor assembly including a variable and a fixed capacitor, comprising:
 a first, a second, and a third disc;
 a first electrode on one side of said first disc;
 a first electrode on one side of said second disc; means for mounting said first and second discs so that said first electrodes thereof face each other;
 a second electrode on said second disc on the opposite side thereof;

a first electrode on said third disc;

means for mounting said third disc so that said first electrode thereof faces said second electrode of said second disc;

a second electrode on the opposite side of said first disc; and a piezoelectric means mounted on said second electrode of said first disc.

21. A capacitor assembly as set forth in claim 20, said first and second electrodes on said second disc comprising central layers on said sides of said second disc, there being a third electrode at the circumference thereof and extending along the circumferential margins of the two sides of said second disc.

22. A capacitor assembly as set forth in claim 20, said discs being mounted in a common casing, each of said second and said third discs having a degassing opening respectively communicating with the spaces defined by said two mounting means.

23. A capacitor assembly as set forth in claim 20, wherein said first disc consists of a sapphire crystal.

24. An electromechanical vibrator comprising:

a corundum disc;

a main electrode on said disc;

a first and a second piezoelectric wafer segment on said main electrode and forming with said disc a vibrator unit having a resonant frequency;

a first and a second electrode respectively contacting said first and second wafer segments apart from said main electrode; and an electronic amplifier interconnecting said first and second electrodes, with said wafer segments and said corundum disc constituting an electromechanical feedback loop completing an oscillator circuit driving said corundum disc at said resonant frequency.

25. A capacitor assembly including a variable capacitor and a fixed capacitor, said assembly comprising three discs, means supporting said discs at their edges in a coaxial array with capacitor gaps between pairs of adjacent discs;

each pair of opposing faces of adjacent pairs of discs providing capacitor electrodes that are mutually insulated from each other; and means located on one of said outer discs connectable in an oscillator circuit for causing said outer disc to vibrate whereby the capacitor gap between said outer disc and the center disc alternates at said frequency.

26. A capacitor as defined in claim 25 wherein one of said discs forming said variable capacitor is provided with an annular recess to form a projecting anvil at the center thereof and wherein the capacitor electrode on said latter one disc is located on said anvil whereby the capacitance of said variable capacitor is determined substantially entirely by the area of said anvil and the gap between the anvil and the opposite disc.

27. In a D.C.-A.C. converter:

a vibratory capacitor having a pair of relatively movable capacitor electrodes, means for applying to said electrodes a D.C. signal to be measured, a vibration generator for effecting relative oscillatory movement of said electrodes to periodically vary the capacitance of said capacitor, and circuit means capacitively coupled to said vibratory capacitor for measuring the amplitude of oscillation of the voltage of the vibratory capacitor produced by the combined action of said D.C. signal and the oscillatory movement of said electrodes;

the improvement wherein said vibratory capacitor comprises a circular vibratory plate having an electrode on one side thereof to provide a vibrating capacitor electrode, means for rigidly supporting said circular plate along its periphery, said vibratory plate establishing the resonant frequency of said oscillatory movement, and electromechanical means for vibrating said plate at said frequency, said electromechanical means comprising an amplifier connected to form an oscillator and also comprising a piezoelectric element that is mounted on said vibratory plate and is connected in said oscillator thereby tuning said oscillator to the resonant frequency of said plate.

28. A D.C.-A.C. converter as defined in claim 27, wherein said supporting means is constructed and arranged to apply only a radial compressive force to said plate about its periphery to support said plate.

29. In a D.C.-A.C. converter:

a vibratory capacitor having a pair of relatively movable capacitor electrodes, means for applying a D.C. signal to be measured across said electrodes, a vibration generator for effecting relative oscillatory movement of said electrodes to periodically vary the capacitance of said capacitor, and circuit means capacitively coupled to said vibratory capacitor for measuring the amplitude of oscillation of the voltage of said vibratory capacitor produced by the combined action of said D.C. signal and the oscillatory movement of said electrodes;

the improvement wherein said vibratory capacitor comprises a vibratory plate that establishes the resonant frequency of said oscillatory movement;

said vibratroy plate comprising a metallic layer formed on a body member and acting as a vibrating electrode on said capacitor, said body member being composed of an inorganic monocrystalline material having a ratio of ($Y/\rho$) of Young's modulus ($Y$) to density ($\rho$) greater than about $5 \times 10^{11}$ cm.$^2$/sec.$^2$; and electromechanical means for vibrating said plate at said frequency.

30. In a D.C.-A.C. converter:

a vibratory capacitor having a pair of relatively movable capacitor electrodes, means for applying a D.C. signal to be measured across said electrodes, a vibration generator for effecting relative oscillatory movement of said electrodes to periodically vary the capacitance of said capacitor, and circuit means capacitively coupled to said vibratory capacitor for measuring the amplitude of oscillation of the voltage of said vibratory capacitor produced by the combined action of said D.C. signal and the oscillatory movement of said electrodes;

the improvement wherein said vibratory capacitor comprises a vibratory plate that is in the form of a circular body member having a metallic layer on one surface thereof providing a vibrating electrode of said capacitor, means for rigidly supporting said circular plate along its periphery, said circular plate establishing the resonant frequency of said oscillatory movement; and electromechanical means for vibrating said circular plate at said frequency.

References Cited by the Examiner

UNITED STATES PATENTS

| 2,588,513 | 3/1952 | Giacoletto | 317—249 |
| 3,166,696 | 1/1965 | Furman | 317—250 |
| 3,195,037 | 7/1965 | Van Nie | 324—120 |

ROY LAKE, *Primary Examiner.*

J. KOMINSKI, *Assistant Examiner.*